May 26, 1953  H. B. MEDLEY  2,639,834
FASTENING MEANS FOR CLOSURES
Filed May 26, 1950

H. B. Medley
INVENTOR.
BY Stanley M. Udale
ATTORNEY

Patented May 26, 1953

2,639,834

UNITED STATES PATENT OFFICE 2,639,834

FASTENING MEANS FOR CLOSURES

Harry B. Medley, Detroit, Mich., assignor to George M. Holley and Earl Holley

Application May 26, 1950, Serial No. 164,487

1 Claim. (Cl. 220—46)

The object of this invention is to provide the float chamber of an automobile with a concave transparent cover to enclose the float and with a gasket mounted in a vertical plane. The carburetor is of the downdraft type.

Figure 1:
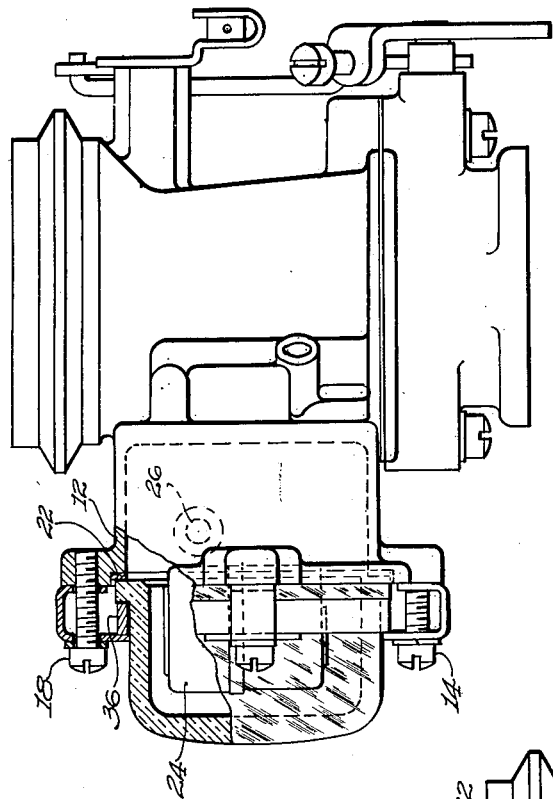
Fig. 1 shows in elevation the preferred form of my invention.
Figure 4:
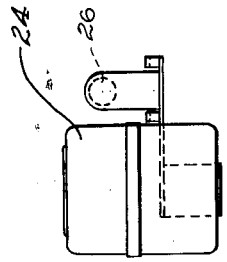
Fig. 4 shows a plan view of the offset float.
Figure 3:
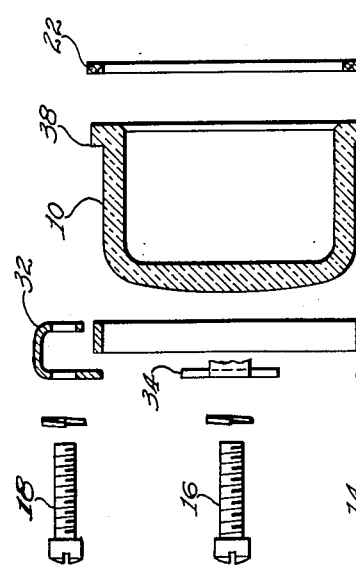
Fig. 3 shows the exploded view of the essential elements of my invention.
Figure 2:
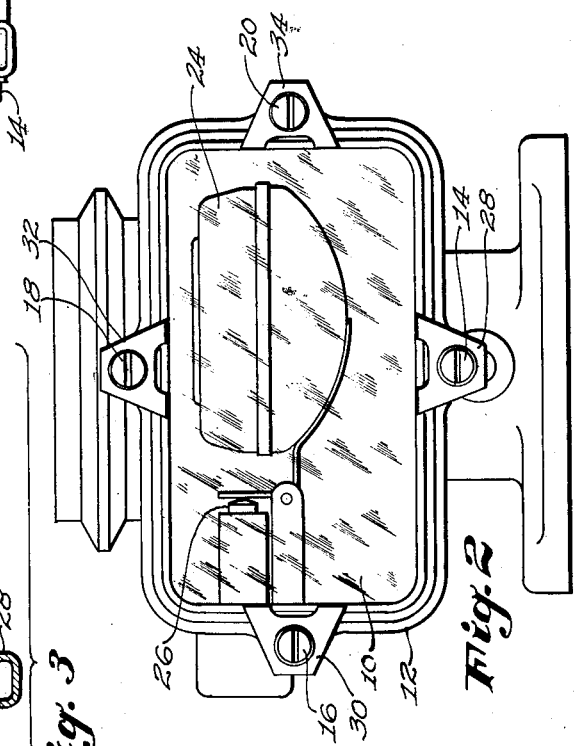
Fig. 2 shows a side view also in elevation.

In the figures, 10 is the glass cover for the float chamber 12. 14, 16, 18 and 20 are the screws which lock the cover 10 to the float chamber 12. 22 is the gasket which prevents leaks. The float 24 is mounted in the float chamber 12 and engages the needle 26 in a well known manner thus maintaining the level constant in the float chamber 12 in a well known manner. Clamps 28, 30, 32 and 34 engage with a stiff rectangular clamping ring 36.

The gasket is made of $\frac{3}{32}$ inch of granulated cork. The plane of the gasket 22 is at right angles to the axis of the pivot of the offset float 24 and parallel to the axis of the carburetor.

The glass cover 10 is $\frac{3}{10}$ inch of molded glass and is made like a deep dish. The float must be as close as possible to the carburetor body so as to minimize the effect of road inclination, etc.

The reason for the apparently empty space to the left of the float in Fig. 1 is that this space is occupied by the economizer valve and by the accelerating pump as well as by the regular metering orifice.

Operation

In operation the glass float cover 10 is clamped against the float chamber 12 and the gasket 22 is held in tight engagement by means of the clamps 28, 30, 32 and 34. The clamping ring 36 being rectangular is sufficiently stiff so as to engage the shoulder 38 of the cover 10.

The advantages of this construction are:

(a) Less heat flows to the gasoline caught in the bowl after a run in hot weather. This residual fuel causes percolation trouble in from 15 to 25 minutes after the engine has stopped. During this interval of time restarting is difficult if not impossible.

(b) Glass is cheaper than die casting metal (zinc) and is not made from imported materials.

What I claim is:

A clamping means for connecting a nonmetallic flanged cover to a metallic body comprising a gasket between said flange and body, a ring surrounding said cover and abutting the outer face of said flange, and clamping means engaging said ring to press said flange and gasket against said body, said clamping means comprising generally J-shaped resilient elements, the short leg thereof bearing against said body and the long leg thereof extending over the outer edge of said ring, and fastening means extending through said legs into threaded engagement with said body.

HARRY B. MEDLEY.

References Cited in the file of this patent

UNITED STATES PATENTS

| Number | Name | Date |
|---|---|---|
| 916,103 | Cartwright | Mar. 23, 1909 |
| 1,082,744 | Goldberg | Dec. 30, 1913 |
| 1,090,208 | Heitger | Mar. 17, 1914 |
| 1,097,039 | Miller | May 19, 1914 |
| 1,207,134 | Carter | Dec. 5, 1916 |
| 1,259,415 | Kuebler | Mar. 12, 1918 |
| 1,332,319 | Carpenter | Mar. 2, 1920 |
| 1,746,619 | Stanco | Feb. 11, 1930 |
| 1,932,044 | Mylius | Oct. 24, 1933 |
| 2,080,570 | Holley | May 18, 1937 |
| 2,258,271 | Walter | Oct. 7, 1941 |
| 2,281,126 | Willits | Apr. 28, 1942 |

FOREIGN PATENTS

| Number | Country | Date |
|---|---|---|
| 884,136 | France | Apr. 12, 1943 |